United States Patent [19]

Maier-Laxhuber et al.

[11] Patent Number: 4,924,676
[45] Date of Patent: May 15, 1990

[54] ADSORPTION COOLER

[76] Inventors: Peter Maier-Laxhuber, Saumweberstrabe 14, D-8000 Munchen 60; Fritz J. Kaubek, Heilmannstrasse 25, D-8000 Munchen 71, both of Fed. Rep. of Germany

[21] Appl. No.: 873,503

[22] Filed: Jun. 12, 1986

[30] Foreign Application Priority Data

Jun. 14, 1985 [DE] Fed. Rep. of Germany ....... 3521484

[51] Int. Cl.⁵ .......................... F25B 17/08; F25D 3/00
[52] U.S. Cl. ........................................ 62/59; 62/106; 62/269; 62/393; 62/143; 62/473; 62/480
[58] Field of Search ................ 62/477, 478, 480, 393, 62/394, 269, 143, 59, 106; 165/104.12

[56] References Cited

U.S. PATENT DOCUMENTS

| 1,512,623 | 10/1924 | Maxwell | 62/143 |
| 1,808,056 | 6/1931 | Mitchell | 62/143 |
| 2,053,683 | 9/1936 | Schlumbohm | 62/478 |

FOREIGN PATENT DOCUMENTS

| 410423 | 2/1925 | Fed. Rep. of Germany | 62/143 |
| 636013 | 9/1936 | Fed. Rep. of Germany | 62/478 |
| 2720561 | 11/1978 | Fed. Rep. of Germany | |
| 312422 | 5/1929 | United Kingdom | 62/477 |

Primary Examiner—Albert W. Davis, Jr.
Attorney, Agent, or Firm—Hoffmann & Baron

[57] ABSTRACT

An adsorption cooler operating in accordance with the periodical adsorption principle and consisting of at least one adsorption container filled with zeolite. At least one condenser with a collecting container for the water which desorbs from the zeolite and an insulated cooling container which may be closed by a shut-off member are serially connected with the adsorption container. In the cooling container, the adsorption cooler generates ice in stages which acts as a cold buffer. The system is usable for example in solar cooling systems, vehicle air conditioning units and air conditioning insulation as well as beverage coolers.

27 Claims, 3 Drawing Sheets

ADSORPTION COOLER

BACKGROUND OF THE INVENTION

The present is concerned with periodically operating, dry adsorption coolers. The coolers are of the type which includes an adsorption container filled with a solid adsorption substance which desorbs steam as an operating substance at a relatively high pressure and adsorbs during a subsequent adsorption phase at a relatively low pressure. The cooler also includes a condenser for liquifying the operating substance and also a subsequently disposed collection container. For many years, dry adsorption devices were used for cooling food stuffs. More recently and at present the more economical compression systems have replaced all of the periodic adsorption processes. Today there are only two continuously operating adsorption systems in use for certain cooling tasks and which operate on the basis of the liquid pairs of substances $LiBr/H_2O$ and $H_2O/NH_3$. In contrast, the more recently suggested pair of substances zeolite/water belongs to the dry pair of substance classification with which only a periodical cooling process is possible. This new pair of substances has very good thermodynamic characteristics, but its use in cooling technology is limited by the required periodical mode of operation.

SUMMARY OF THE INVENTION

With the above background in mind, it is among the primary objective of the present invention to provide a periodically operating adsorption apparatus with which a continuous cooling is possible.

This object of the invention is satisfied by filling an adsorption container with the pair of substances zeolite/water. Connected in succession are the adsorption container, a collecting container and a shut-off member. The shut-off member is connected as well to a cooling container with a heat exchanger for cooling of liquids.

A further objective is to provide a periodically operating dry adsorption cooler including an adsorption container filled with a solid adsorption substance which desorbs an operating substance at a relatively high pressure and adsorbs during a subsequent adsorption phase at a relatively low pressure. The cooler also contains a condenser for liquifying the operating substance and a subsequently disposed collection container. The liquid operating substance flows from the collection container where it evaporates during the adsorption phase, and passes through a shut-off member into an insulated container and is able to flow in the form of steam through the shut-off member back into the adsorption substance.

A further objective of the invention is to provide an adsorption cooler utilizing an adsorption substance in the form of zeolite of the type Mg-A, Na-Y or H-Y, in particular zeolite with the commercial designation Y-72 and Y-52 sold commercially by Union Carbide Corporation, and utilizing water as an operating substance.

It is a further objective of the present invention to provide an adsorption cooler which includes a second shut-off member and subsequent thereto a further collecting container and condenser and a further zeolite filled adsorption container connected to the cooling container.

A further objective of the present invention is to provide an adsorption container made from glass and being suitable for adsorbing radiation heat and to provide zeolite that is blackened or contains admixtures of heavy light adsorbing substances.

A further objective of the present invention is to provide an adsorption cooler with adsorption containers that are in good heat conducting contact with the exhaust lines of a motor vehicle.

A further objective of the present invention is to provide an adsorption cooler with condensers that are designed for air and water cooling.

A further objective of the present invention is to provide an adsorption cooler wherein the cooling container portion thereof contains a heat exchanger which is suitable for the adsorption of heat from drinks.

Still a further object of the present invention is to provide an adsorption cooler with a heat exchanger mounted in the cooling container and connected with a conventional heater regulator of a motor vehicle heating system by means of the cooling water cycle.

It is a further objective of the present invention to provide an adsorption cooler with a shut-off member in the form of a thermostat valve which is controlled by the discharge temperature of the medium flowing through the heat exchanger.

A further objective of the present invention is to provide an adsorption cooler with a shut-off member in the form of an easy motion check valve provided with a magnetic or thermostatic auxiliary means to let the condensate flow off.

A further objective of the present invention is to provide an adsorption cooler that operates with shut-off members closed during the desorption phase and open at the start of the adsorption phase so that the condensate can flow from the collection containers into the cooling container.

A further objective of the present invention is to provide a shut-off member that remains open during the adsorption phase only when the liquids flowing through the heat exchanger exceeds a predetermined value. The adsorption container can also be designed so that it is exposed to sun radiation during the day for heating purposes and can be cooled off at night by emitting heat radiation and heat conductivity to the environment.

A further objective of the present invention is to provide an adsorption cooler system wherein the shut-off members are closed during a long interruption in operation and that at first both shut-off members are opened during the start of the operation, no matter in which phase the given adsorption container had been at the end of the preceding operational phase.

With the above objectives among others in mind, reference is made to the drawings.

DETAILED DESCRIPTION OF THE INVENTION

Figure 1:
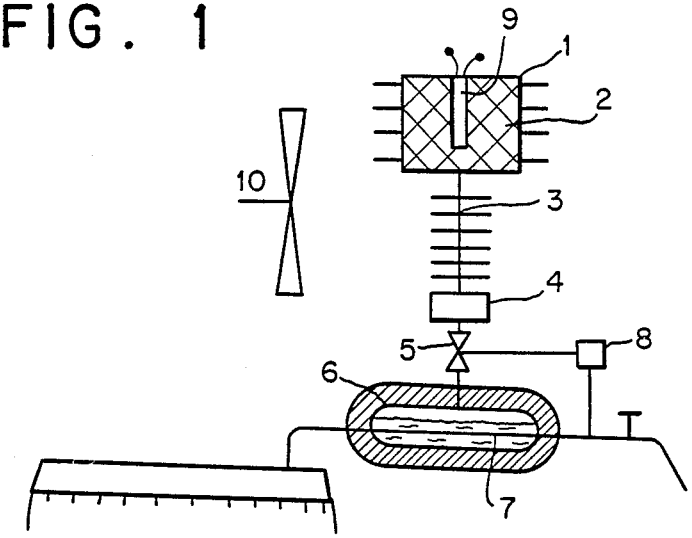
FIG. 1 is a schematic illustration of an adsorption cooler of the invention being used as a beer cooler.

In the embodiment of FIG. 1, an adsorption container 1 is provided with cooling ribs and with zeolite 2 therein. A condenser 3, a collecting container 4 and a shut-off member 5 are connected to the adsorption container 1 in a serial manner. A heat exchanger 7 extends through the cooling container 6. The heat exchanger 7 is a part of a beer line from a barrel to a tap. The temperature of the discharging beer is controlled by a regulator 8 which acts on the shut-off member 5. An electrical heater 9 heats the adsorption container in the desorption phase. A ventilator 10 takes care of the heat exhaustion.

Figure 1A:
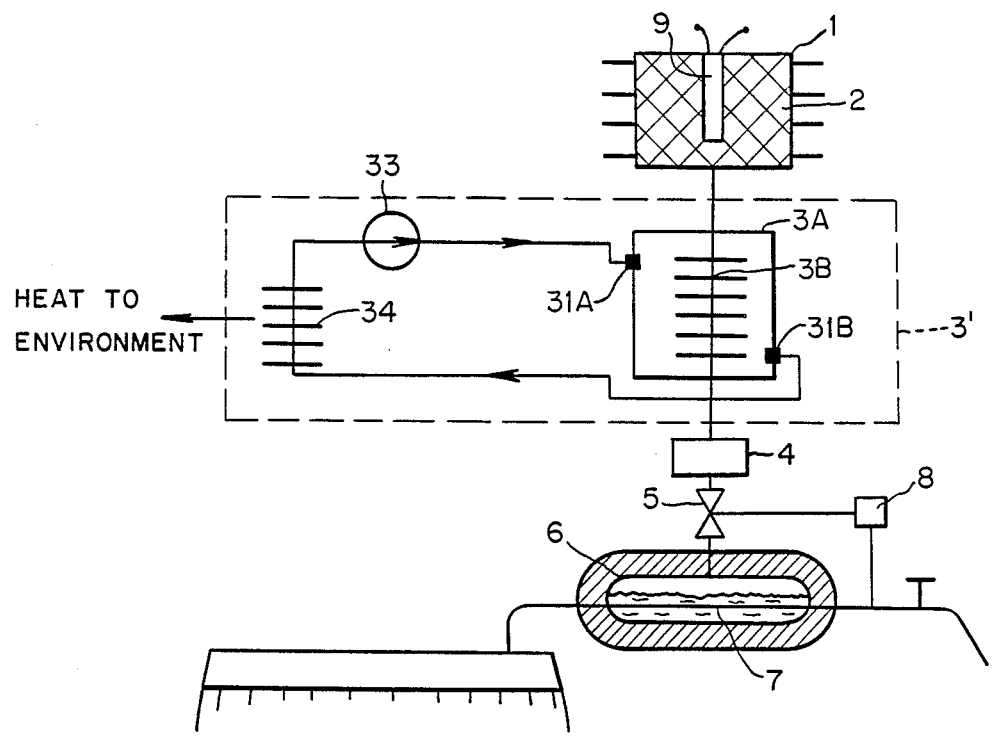
FIG. 1A is a schematic illustration of an alternative embodiment of an adsorption cooler of the present invention being used as a beer cooler.

In an alternative embodiment shown in FIG. 1A, an adsorption cooler similar to that of FIG. 1 is illustrated, with a slight modification. Instead of providing an "air cooled" condenser 3 as in FIG. 1, FIG. 1A shows a conventional "water-cooled" condenser 3'. In one embodiment, the water cooled condenser comprises means for passing water or other fluid over the heat exchange surfaces of the condenser 3B, as by enclosing such surfaces within a water-tight enclosure 3A, having an input port 31A and output port 31B connected in series in a conventional water cooling cycle having a pump 33 and preferably a second heat exchanger 34, as illustrated in FIG. 1A.

Figure 2:
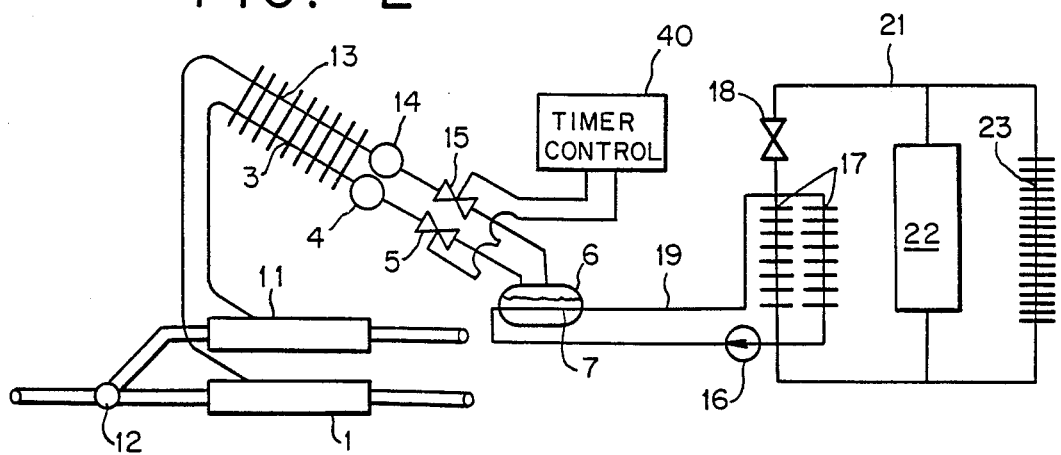
FIG. 2 is a schematic view of an alternative embodiment of the adsorption cooler of the present invention employing two adsorbers and being used as an air conditioner.

In the embodiment depicted in FIG. 2, the adsorption cooler is being used as a vehicle air conditioning unit. Two adsorption containers 1 and 11 are supplied with heat through two exhaust gas lines. A flap 12 controls the exhaust gas flow. The condensers 3 and 13, the collecting container 4 and 14 and the shut-off members 5 and 15 are connected in a serial manner to the adsorption containers 1 and 11. The insulated cooling container 6 contains the heat exchanger 7. The adsorption cooler is connected with the cooling water cycle of the vehicle. A circulation pump 16 circulates the cool water through the heating register 17. The cooling water cycle is separated from the remainder of the cooling water system of the engine by a shut-off device 18.

The operational principles of the present invention are applicable to both the embodiments of FIGS. 1 and 2. The periodic mode of operation of the adsorption cooler is separated into two partial phases.

Zeolite is heated in a desorption phase. For example in the embodiment of FIG. 1, electric heater 9 is employed to heat the zeolite 2. In the embodiment of FIG. 2, the exhaust gases heat the zeolite in the container.

In this phase, steam is desorbed from the zeolite and is liquified in the connected condenser 3. The condensate flows drop by drop into the collecting container 4. The shut-off member 5 prevents a discharging into the cooling container 6. The duration of the desorption phase can take between a few seconds and a few days depending upon the geometry of the adsorption container and the amount of zeolite.

The zeolite is cooled in the following adsorption phase. It starts with the adsorption of steam during the cooling down phase in accordance with its thermodynamic adsorption characteristic. The steam which is siphoned off or removed by suction from the adsorption container 1 is resupplied from the collecting container 4. Thus, the condensate cools below the condenser temperature. The shut-off member 5 is open during this cooling operation. The condensate flows into the insulated cooling container 6 and evaporates further therein.

Thereupon, the steam flows through the collecting container 4 back to the zeolite 2 while the shut-off member 5 is open. At an evaporation temperature of 0° C., the water collecting in the cooling container 6 starts to freeze. If the heat fed through the heat exchanger 7 is less than the cold generated by the adsorption, the ice layer grows in the cooling container 6. Therefore, a corresponding amount of water is introduced into the cooling chamber in order to store the desired total cold production in the form of ice.

The adsorption phase is finished when the zeolite has reached its lowest temperature and when the steam pressure in the adsorption container 1 has increased to the evaporation pressure in the cooling container 4. The adsorption phase is interrupted when shut-off member 5 is closed. The zeolite cannot adsorb any water, however, its adsorption ability is maintained. As soon as the shut-off valve 5 is opened, steam can flow to the zeolite and cool the cooling container 6. Due to a controlled opening and closing, the temperature of the water entering and filling the cooling container or the temperature of the liquid flowing through the heat exchanger can be accurately controlled during the adsorption phase.

The shut-off member 5 is closed before the repeated desorption phase. Hot steam is condensated from the zeolite 2 in the condenser 3 and not in the cooling container 6. The ice layer which had built up in the cooling container is not melted down. The stored amount of cold or cooling power is sufficient that it covers the demand for cooling power of the consumer during the desorption phase during which a generation of cooling power is not possible in this system. The stored cold or cooling power is cold on demand through the heat exchange 7. Therefore, the maximum removal of the cold capacity may be a multiple of the average cold capacity.

The adsorption cooler of the present invention is capable of being advantageously used in the cooling of drinks, for example, beer, water, lemonades and other beverages. The warm beverage flows from a beverage container through the heat exchanger in the cooling container and releases heat to whatever water is present and filling the cooling container. The discharge temperature of the beverage can be controlled in a simple manner by a thermostat which opens the shut-off member when a predetermined temperature is exceeded and closes it when the temperature falls below the predetermined temperature. The cooling effect is immediately available and, also, with an unusually high efficiency in a desorbed and cooled adsorption cooler. This is in contrast to a conventional compression system. The customary cooling water buffer in compression systems is no longer required. An effective cooling of the beverages is made possible even without a connection to electricity.

Generally, it is recommended to heat the zeolite during the desorption phase by means of an electrical resistor line. Since adsorption and condensating heat (above 50° C.) may be generated at high temperatures, the use of waste heat is also possible. For example, it is advantageous to preheat consumption water through a liquid cooled condenser. However, the condenser should be additionally air cooled so as to emit condensation heat to the ambient air, if need be.

Furthermore, cooling rooms or cooling furniture may be cooled with the adsorption cooler in accordance with the present invention. In those instances, a cooling brine circulates through the heat exchanger instead of the beverages.

The position and shock proof independent adsorption enables the installation of the adsorption cooler in motor vehicles. The adsorption cooler may be used for air conditioning automobiles and buses as well as cooling of commercial vehicles. This is depicted in the embodiment of FIG. 2 where the exhaust gas line is separated into two parallel systems of the present invention. The two parallel systems operate side by side in the same manner. They contain corresponding parts. Accordingly, adsorption containers 1 and 11 are serially connected with condensers 3 and 13, collecting containers 4 and 14, and shut-off members 5 and 15 respectively. The shut-off members 5 and 15 are connected to a single cooling container 6 which surrounds the heat exchanger 7. Accordingly, describing one of the serial arrangements of components of the adsorption cooler of the present invention also serves to describe the companion serial arrangement.

As shown in FIG. 2, a flap system 12 in the exhaust line deflects the exhaust gases over the adsorption containers 1 and 11 sequentially as determined by the control flap 12. Thus, first the exhaust gases are directed by control flap 12 to container 1 during the desorption phase of that container and away from adsorption container 11 which is in the adsorption phase of its cycle. The direction is reversed when adsorption container 11 is in the desorption phase and adsorption container 1, is in the adsorption phase. By use of the appropriate control flap, the exhaust gases can be directed to one or both of the adsorption containers at the same time or in sequence depending upon the chosen means of operation. Alternatively, the heating of the zeolite may also be performed by means of an idle heater when the vehicle is not being used.

A separate burner is normally provided when using refrigerated trailers. The transmission of the cooling power or cold stored in the cooling container 6 into the space to be cooled is performed through a brine cycle 19 with a separate circulation pump 16, as illustrated in FIG. 2. As shown, heat exchanger 7 (mounted in the insulated cooling container 6) is connected in series with a heat exchanger 17 (i.e. cooling register) and the circulation pump 16 to form a vehicle cooling circuit. In a passenger automobile, an engine 22 is connected in parallel with a vehicle heater and an engine radiator 23 by way of a cooling water cycle 21 of the 22. In this arrangement, the vehicle heater comprises a conventional heat regulator 18 and the heat exchanger 17, which functions as a heating register in the vehicle heater circuit (i.e. working water cycle). Notably, heating register 17 of the vehicle heater may be used alternatively as a cooling register in the vehicle cooling circuit. Only the circulation pump 16 has to be used when cooling is required.

Particular advantages are obtained with respect to a vehicle cooling during the starting phase with a hot inner vehicle space in a stop and go traffic situation. In contrast to the mechanical cooling the cooling effect remains present over a longer time period after the motor has been shut-off, depending on the amount of zeolite and ice in the cooling container. This is certainly a welcome effect for drivers frequently in heavy traffic such as taxi drivers. The stop and go cooling problems are solved in the same manner. A vehicle which has been heated by sun rays may be cooled to an acceptable inner temperature in about 20 minutes. A vehicle with an adsorption cooler of the present invention may be cooled with high efficiency before the motor is even started. When the shut-off member is opened for a short time for discharging the condensate into the cooling container when shutting off the motor and is subsequently closed, the zeolite can cool off in the uncharged condition and can adsorb heavily after a renewed opening of the shut-off member. The cooling efficiency generated in the cooling container is then particularly high.

The adsorption cooler may be used in the heating phase of the motor transitorily for heating the inner space by means of a simple control technical measure. For this purpose, the shut-off member to the cooling container remains closed during the desorption phase. The steam desorbed from the zeolite condenses on the heat exchanger in the cooling container. The condensation heat is transmitted to the inner space through the cooling water cycle and the heating register.

Figure 3:
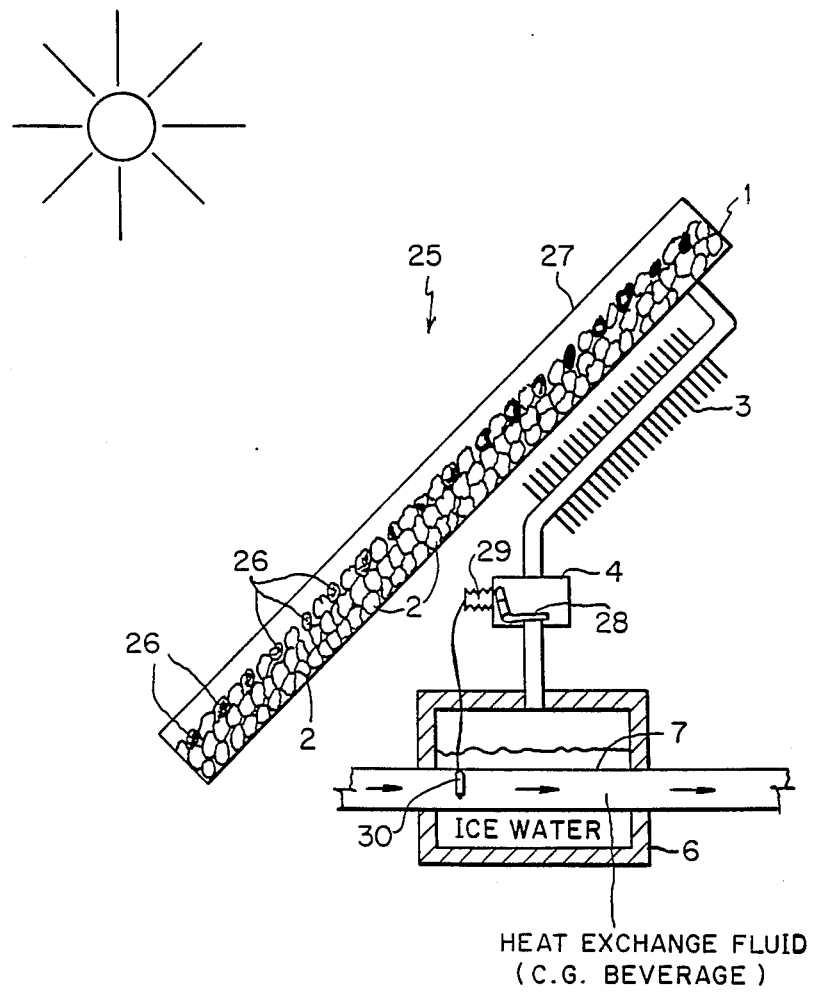
FIG. 3 is a schematic view of an alternative embodiment of the adsorption cooler of the present invention, employing a solar ray absorbing adsorption container and an easy motion-check valve.

A further very effective application of the present adsorption cooler is found with respect to the brine cooling system illustrated in FIG. 3. In the system 25, the adsorption cooler is heated during the day by means of sun rays. During the night the zeolite cools off and adsorbs the water. In this manner, the adsorption cooler generates ice during the cooling off period which remains stored in the cooling container and may be used for cooling tasks the following day. It is recommended that the cooling container be of sufficiently large dimensions so that a number of days may be bridged without any sun rays. The brine operated adsorption cooler can be used without any additional components like water cooling or hot water storage, in contrast to all known solar cooling systems. A simple easy motion check valve is sufficient as the shut-off member which is supported for opening after the desorption phase by means of an auxiliary device, for example a magnet or a thermostat. The check valve between the cooling container and adsorption container remains open by means of the pressure difference as soon as the condensate is discharged into the cooling container.

In the solar-operated adsorption cooler 25 illustrated in FIG. 3, the adsorption container 1 may be designed as a collimating collector which more easily reaches the required temperatures of above 130° C. for an effective desorption. The adsorption container preferably consists of glass 27 which is provided with a suitable coating. For an improved heat adsorption, zeolite 2 may be blackened or may contain black light adsorbing admixtures 26, like charcoal. The shut-off member of the adsorption ceoler 25 is realized as an "easy motion" check valve 28 provided at the bottom opening of the collection container 4. Check valve 28 has an opening and closing motion such that it can be opened and closed easily, that is with minimal force or displacement provided by a thermostatic lever or switch 29 known in the art. A heat exchanger 7 is contained in the insulated cooling container 6 and is adapted for passing fluid (e.g. beverage) through the heat exchanger 7. The temperature of the fluid passing through the heat exchanger 7, is sensed by an auxiliary temperature sensing device 30. The thermostatic switch 29 opens and closes the easy motion check valve 28 in response to a predetermined temperature level sensed by the auxiliary temperature sensing device 30, whereby the opening of the easy motion check valve 28 permits the liquefied operating substance in the collection container 4, to flow into the insulated cooling container.

Of course, adsorption coolers with only one adsorption container can adsorb heat during the desorption phase. For example, in a motor vehicle where exhaust gas is constantly available, this type of heat use is insufficient. However, this difficulty may be circumvented in that a second shut-off member with a collecting container, a condenser and an adsorption container is connected to the cooling container. This system is depicted in FIG. 2. As previously stated, the mode of operation of the secondary system is identical with the primary system described in detail above in regard to desorption and adsorption phases. However, an additional advantage in the parallel systems is that the individual phases may be performed completely independent of each other. While one desorption container is heated, the other may be cooled, for example, thus increasing the amount of ice in the cooling container. However, both adsorption containers may operate at the same phase, for example, in the aforementioned cooling process of the vehicle during the starting procedure.

In the embodiment of FIG. 2, an optional timer control 40 is provided to the shut-off valves 5 and 15. The timer control operates when the shut-off members 5 and 15 are closed during a long interruption in operation of the cooler system. The timer control 40 ensures that after a long interruption in operation, both shut-off members 5 and 15 initially are opened during the start of operation, regardless of the phase either one of the adsorption containers had been in, at the end of the preceding operating phase.

The zeolites which are particularly suitable are the ion exchanged Mg-A-zeolite and the Y-zeolites Y-52 and Y-72 available commercially from Union Carbide Corporation. These zeolites have sufficient cycle and temperature stabilities. Thus, their use is permitted during high desorption and condensation temperatures.

Thus, the several aforenoted objects and advantages are most effectively attained. Although several somewhat preferred embodiments have been disclosed and described in detail herein, it should be understood that this invention is in no sense limited thereby and that scope is to be determined by that of the appended claims.

We claim:

1. A periodically operating dry adsorption cooler comprising:
    an adsorption container containing a solid adsorption substance in the adsorption container, the solid adsorption substance being capable of desorbing an operating substance in the form of vapor at a relatively high vapor pressure and adsorbing during the subsequent adsorbing phase at a relatively low vapor pressure;
    a condenser for liquefying the operating substance and being connected to the adsorption container;
    a collection container connected to the condenser, and the adsorption container, condenser, and collection container being arranged so that the operating substance liquefied in the condenser is collected in the collection container;
    an insulated cooling container for receiving the liquid operating substance from the collection container, the storage capacity of the insulated cooling container being sufficiently large so that the cooling container is capable of receiving therein operating substance in a sufficient quantity so that operating substance remains in the cooling container during the adsorption phase and at least a portion of the non-adsorbed liquefied operating substance solidifies in the insulated cooling container; and
    a selectively operable shut-off member which can be opened and closed independently of the temperature and pressure of said adsorption cooler, and being located between the collection container and the insulated cooling container, whereby when the shut-off member is opened during the adsorption phase, the liquid operating substance in the collection container can flow into the insulated cooling container wherein a portion of the liquid operating substance evaporates into vapor, and the liquid operating substance can flow through the shut-off member in the form of vapor and be adsorbed back into the adsorption substance during the adsorption phase.

2. An adsorption cooler in accordance with claim 1 wherein the adsorption substance is a zeolite selected from the group consisting of Mg-A, Na-Y, H-Y, Y-72 and Y-52, and wherein said operating substance is water, and the non-evaporated portion of which in the insulated cooling container solidifies to form ice.

3. An adsorption cooler in accordance with claim 1 wherein a second shut-off member and subsequent thereto a further collecting container and condenser and a further zeolite filled adsorption container are connected to said cooling container.

4. An adsorption cooler in accordance with claim 1 wherein the adsorption container is made from glass and is suitable for adsorbing radiation heat.

5. An adsorption cooler in accordance with claim 4 wherein the zeolite is blackened.

6. An adsorption cooler in accordance with claim 4 wherein the zeolite contains admixtures of heavy light adsorbing substances.

7. An adsorption cooler in accordance with claim 1 wherein each adsorption container is in good heat conducting contact with an exhaust line of a motor vehicle.

8. An adsorption cooler in accordance with claim 1 wherein each condenser is designed for air and water cooling.

9. An adsorption cooler in accordance with claim 1 wherein a heat exchanger for passing fluids through the heat exchanger and adsorbing heat from the fluid, is contained in the cooling container.

10. An adsorption cooler in accordance with claim 1 wherein the heat exchanger mounted in the cooling container is connected with a conventional heat regulator of a motor vehicle heating system by means of the cooling water cycle of the motor vehicle.

11. An adsorption cooler in accordance with claim 1 wherein said insulated cooling container contains a heat exchanger for passing a fluid through said heat exchanger and adsorbing heat from said fluid, and wherein the shut-off member is a thermostat valve which during said adsorption phase, is controlled by the discharge temperature of said fluid passing through said heat exchanger.

12. An adsorption cooler in accordance with claim 1 wherein said insulated cooling container contains a heat exchanger for passing a fluid through said heat exchanger and adsorbing heat from said fluid, and wherein the shut-off member is an easy motion check valve which during the adsorption phase, can open and close in response to a predetermined temperature level of said fluid passing through said heat exchanger, the temperature of said fluid passing through said heat exchanger being sensed by a temperature sensing device, whereby said opening of said easy motion check valve permits said liquefied operating substance in said collection container to flow into said insulated cooling container.

13. An adsorption cooler in accordance with claim 3 wherein each shut-off member is adapted to be closed during the desorption phase and adapted to be opened at the start of the adsorption phase so that the liquefied operating substance can flow from each collection container into the insulated cooling container.

14. An adsorption cooler in accordance with claim 11 wherein the shut-off member is adapted to remain open during the adsorption phase only when the temperature of the liquid flowing through the heat exchanger exceeds a predetermined temperature value.

15. An adsorption cooler in accordance with claim 13 wherein the adsorption container is exposed to sun radiation during the day and is permitted to cool off during the night by emitting heat radiation and heat conductivity to the environment.

16. An adsorption cooler in accordance with claim 3 wherein the shut-off member is adapted to be closed during a predetermined length of time of interrupted operation and that, at first all shut-off members are adapted to be open during the start of the operation regardless of which phase either one of said adsorption containers had been in, at the end of the preceding operating phase.

17. A method of operating a periodically operating dry adsorption cooler which includes an adsorption container filled with a solid operating substance which desorbs operating substance in the form of vapor at a relatively high pressure during a desorption phase, and adsorbs the operating substance during a subsequent adsorption phase at a relatively low pressure, a condenser for liquefying the operating substance at a subsequently disposed collection container, an insulated cooling container, and a selectively operable shut-off member located between the collection container and the insulated cooling container and which can be opened and closed independent of the temperature and pressure of said adsorption cooler, said method comprising:
   (a) selectively closing said shut-off member to prevent desorbed operating substance from passing to said insulated cooling container during the desorption phase;
   (b) heating the adsorption container during the desorption phase to cause the solid adsorption substance to desorb the operating substance;
   (c) passing the desorbed operating substance to the condenser for liquification thereof; and
   (d) selectively opening said shut-off member during the adsorption phase and directing the liquefied operating substance through the shut-off member into the insulated cooling container wherein the liquefied operating substance in the insulated cooling container evaporates during the adsorption phase and the evaporated portion of the liquefied operating substance is permitted to flow through the shut-off member in the form of vapor and be adsorbed back into the adsorption substance whereby at least a portion of the non-evaporated liquefied operating substance in the insulated cooling container solidifies.

18. The invention in accordance with claim 17, wherein said method further comprises prior to step (a), said method comprises providing
   a second zeolite filled adsorption container,
   a second collection container,
   a second condenser connected between said second zeolite filled adsorption container and said second collection container, and
   a second selectively operable shut-off member connecting said collection container with said insulated cooling container.

19. The invention in accordance with claim 17 wherein step (c) said liquification of said desorbed operating substance in said condenser involves one of air and water cooling.

20. The invention in accordance with claim 17 wherein the insulated cooling container contains a heat exchanger for passing a beverage therethrough and adsorbing heat from said beverage, and wherein step (d) upon the solidification of at least a portion of the non-evaporated operating substance in the insulated cooling container, said method further comprises adsorbing heat from said beverage.

21. The invention in accordance with claim 17 wherein step (d) further comprises connecting said heat exchanger with a conventional heat regulator of a motor vehicle heating system, by means of a cooling water cycle, so as to adsorb heat from cooling fluid passing through said heat exchanger connected in said cooling water cycle.

22. The invention in accordance with claim 20 wherein the shut-off member is a thermostat valve, and where during said adsorption phase, step (d) further comprises controlling said shut-off member by the discharge temperature of said beverage flowing through said heat exchanger.

23. The invention in accordance with claim 17 wherein said insulated cooling container contains a heat exchanger for passing a fluid through said heat exchanger and absorbing heat from said fluid, wherein the shut-off member is an easy motion check valve and where during the adsorption phase, step (d) further comprises opening and closing said easy motion check valve, in response to a predetermined temperature level of said fluid passing through said heat exchanger, the temperature of said fluid passing through said heat exchanger being sensed by a temperature sensing device, whereby said opening of said easy motion check valve permits said liquefied operating substance in said collection container to flow into said insulated cooling container.

24. The invention in accordance with claim 18 wherein step (d) comprises selectively closing each said shut-off member during the desorption phase and step (d) comprises selectively opening each said shut-off member at the start of the adsorption phase so that the liquefied operating substance can flow from the collection containers into said insulated cooling container.

25. The invention in accordance with claim 22 wherein step (d) comprises maintaining said shut-off member open during the adsorption phase only when the temperature of said beverage flowing through said heat exchanger exceeds a predetermined temperature value.

26. The invention in accordance with claim 17 wherein step (b) comprises exposing said adsorption container to sun radiation during the desorption phase, and during step (d), permitting said adsorption container to cool off by emitting heat radiation to the environment.

27. The invention in accordance with claim 18 wherein said method involves interrupting the operation of said adsorption cooler by closing each said shut-off member for a predetermined long period of time with each said adsorption container being in either said adsorption or desorption phase of operation, and then resuming operation of said adsorption cooler by first opening both shut-off members during the start of said operation regardless of which phase either one of said adsorption containers had been in at the end of the preceding operating phase.

* * * * *